(12) United States Patent
Kasahara

(10) Patent No.: US 10,859,808 B2
(45) Date of Patent: Dec. 8, 2020

(54) MICROSCOPE OBJECTIVE

(71) Applicant: OLYMPUS CORPORATION, Hachioji (JP)

(72) Inventor: Takashi Kasahara, Tokyo (JP)

(73) Assignee: OLYMPUS CORPORATION, Tokyo (JP)

(*) Notice: Subject to any disclaimer, the term of this patent is extended or adjusted under 35 U.S.C. 154(b) by 78 days.

(21) Appl. No.: 16/378,110

(22) Filed: Apr. 8, 2019

(65) Prior Publication Data

US 2019/0324257 A1 Oct. 24, 2019

(30) Foreign Application Priority Data

Apr. 19, 2018 (JP) .................................. 2018-080955

(51) Int. Cl.
| | |
|---|---|
| *G02B 21/33* | (2006.01) |
| *G02B 21/02* | (2006.01) |
| *G02B 9/34* | (2006.01) |

(52) U.S. Cl.
CPC .............. *G02B 21/33* (2013.01); *G02B 9/34* (2013.01); *G02B 21/02* (2013.01)

(58) Field of Classification Search
CPC .......... G02B 21/33; G02B 9/34; G02B 21/02
USPC ....................................................... 359/660
See application file for complete search history.

(56) References Cited

U.S. PATENT DOCUMENTS

| 5,898,524 A * | 4/1999 | Ryzhikov ............... G02B 21/02 359/657 |
| 6,504,653 B2 | 1/2003 | Matthae et al. | |
| 8,724,227 B2 | 5/2014 | Wartmann | |
| 2003/0053218 A1 | 3/2003 | Fujimoto et al. | |
| 2006/0082896 A1 | 4/2006 | Mandai et al. | |
| 2006/0203354 A1 | 9/2006 | Fujimoto et al. | |
| 2016/0116724 A1* | 4/2016 | Abe ..................... G02B 21/33 359/656 |

FOREIGN PATENT DOCUMENTS

| JP | 2002350734 A | 12/2002 |
| JP | 2003021786 A | 1/2003 |
| JP | 2006113486 A | 4/2006 |
| JP | 2006195125 A | 7/2006 |
| JP | 2007121338 A | 5/2007 |

* cited by examiner

*Primary Examiner* — James R Greece
(74) *Attorney, Agent, or Firm* — Holtz, Holtz & Volek PC

(57) ABSTRACT

A immersion microscope objective includes: a first positive lens group that includes at least one positive single lens and a first cemented lens; a second positive lens group that includes a plurality of cemented lenses including a second cemented lens that is the closest to an object; a third negative lens group that includes a first lens component having a concave surface; and a fourth lens group that includes a second lens component that is the closest to the object, the second lens component having a concave surface, wherein the objective satisfies the following conditional expressions:

$$0.986 \leq NA_{ob}/N0 \leq 0.995 \quad (1)$$

$$0.0095 \leq 1/(N1 \times v1) \leq 0.015 \quad (2)$$

where $NA_{ob}$ indicates a numerical aperture of the objective; $N0$, a refractive index that an immersion liquid has for an e line; $N1$, a refractive index that the meniscus lens has for the e line; $v1$, an Abbe number that the meniscus lens has for a d line.

20 Claims, 7 Drawing Sheets

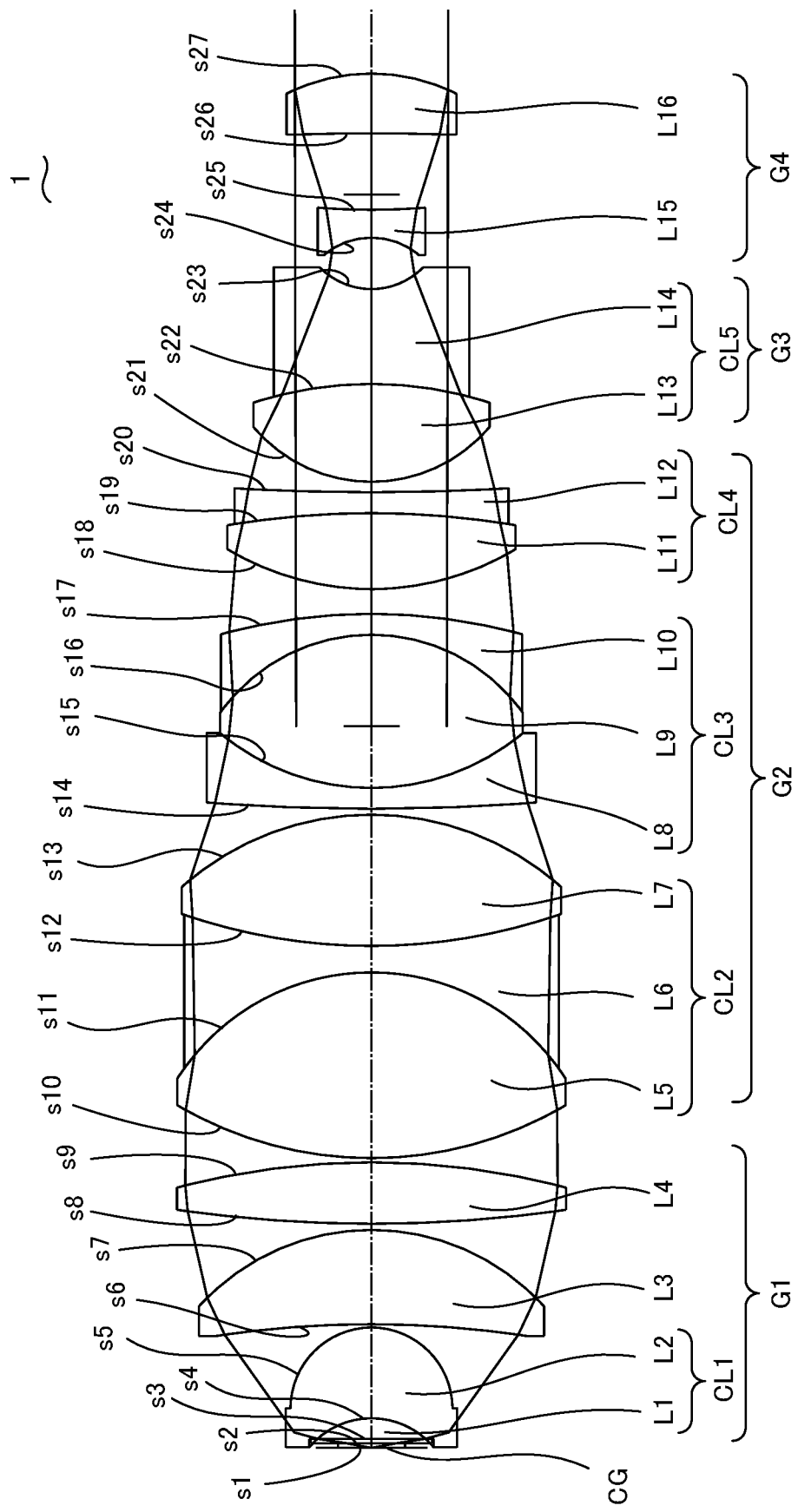
F I G. 1

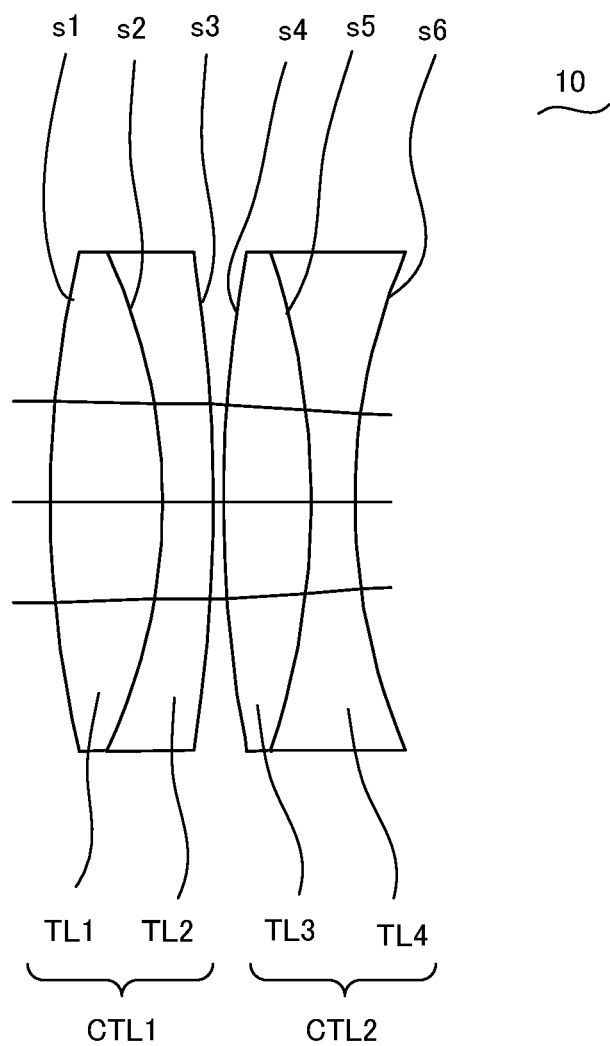
F I G. 2

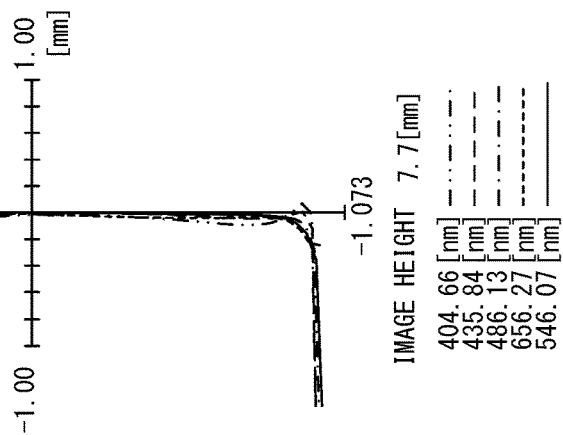
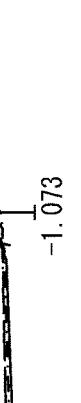
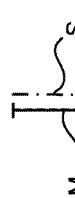

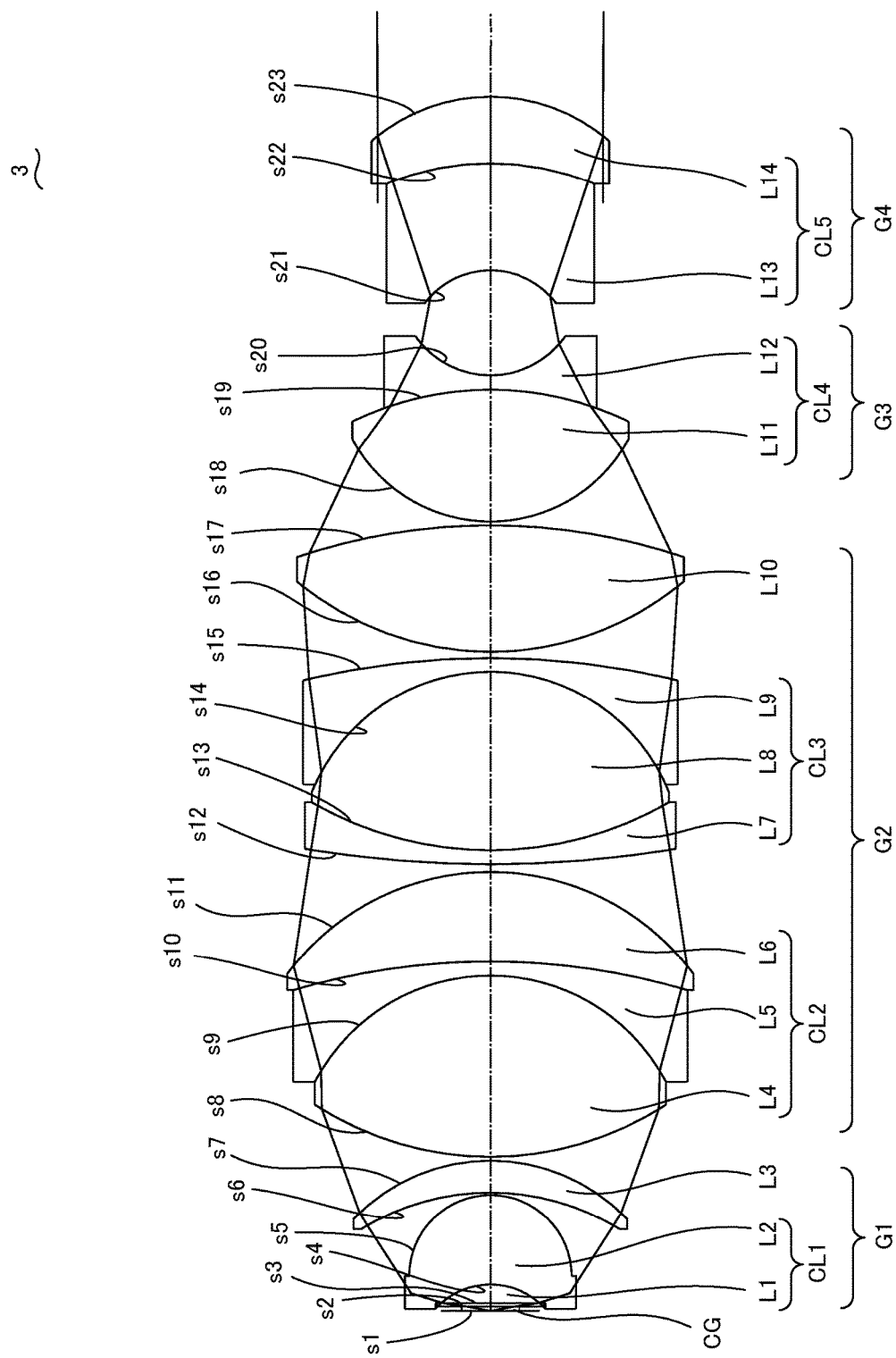
F I G. 6

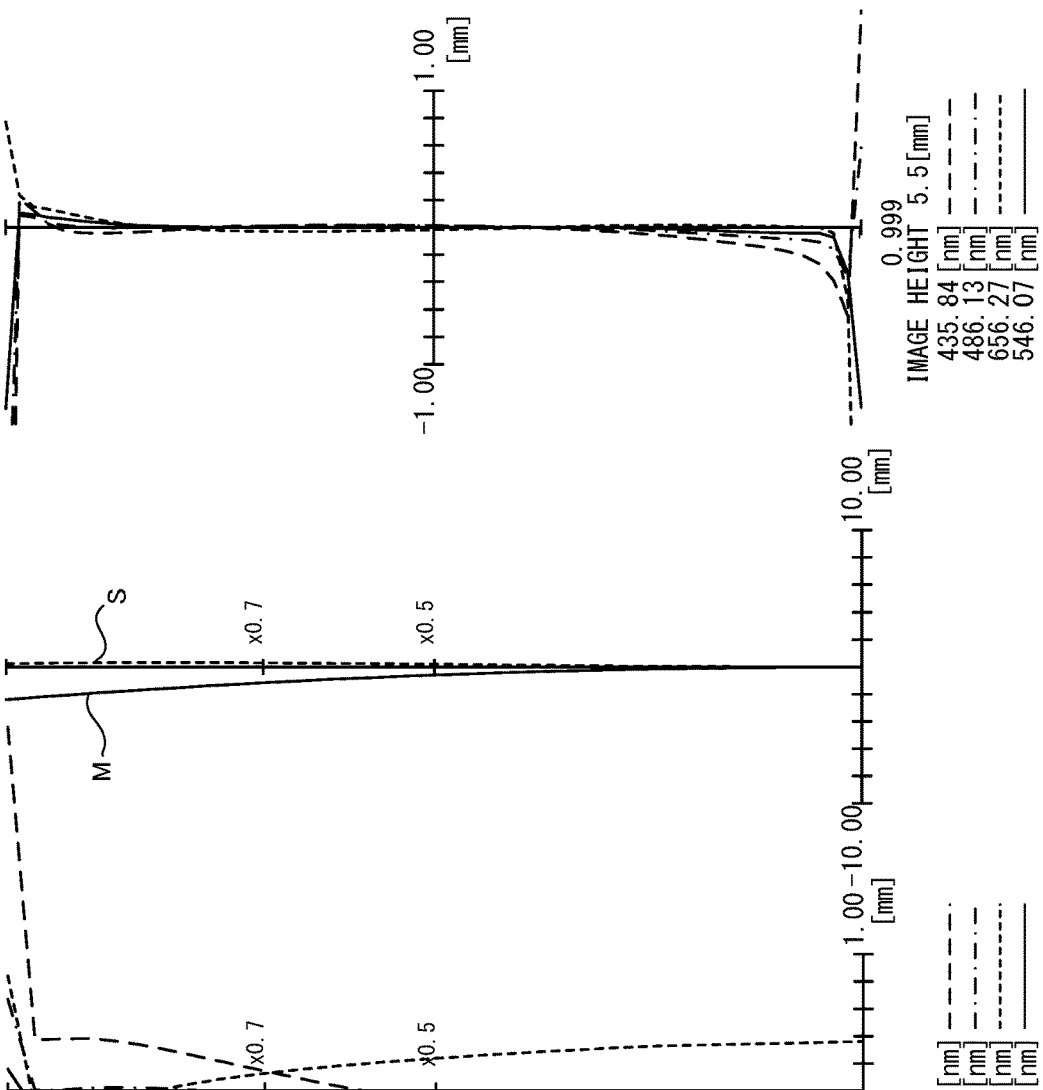

MICROSCOPE OBJECTIVE

CROSS REFERENCE TO RELATED APPLICATIONS

This application is based upon and claims the benefit of priority from prior Japanese Patent Application No. 2018-080955, filed Apr. 19, 2018, the entire contents of which are incorporated herein by this reference.

BACKGROUND OF THE INVENTION

Field of the Invention

The disclosure herein relates to a microscope objective and particularly to an immersion microscope objective.

Description of the Related Art

In the field of biology of recent years, movements and activities within biological cells have been actively observed using total internal reflection fluorescence microscopy (hereinafter referred to as TIRFM). In TIRFM, a microscope objective having a high numerical aperture is used to allow a boundary surface between cover glass and a sample to totally reflect illumination light.

Conventional microscope objectives having a high numerical aperture are described in, for example, Japanese Laid-open Patent Publication Nos. 2006-113486 and 2007-121338.

SUMMARY OF THE INVENTION

An objective in accordance with an aspect of the invention is an immersion microscope objective that includes: a first lens group that has a positive refractive power and includes a first cemented lens and at least one single lens having a positive refractive power, the first cemented lens consisting of a lens having a positive refractive power and a meniscus lens; a second lens group that has a positive refractive power and includes a plurality of cemented lenses, the plurality of cemented lenses including a second cemented lens that is the closest to an object among the components of the second lens group; a third lens group that has a negative refractive power and includes a first lens component having a concave surface facing an image; and a fourth lens group that includes a second lens component that is the closest to the object among the components of the fourth lens group, the second lens component having a concave surface facing the object, wherein the object, the first lens group, the second lens group, the third lens group, and the fourth lens group are arranged in this order. The objective satisfies the following conditional expressions:

$$0.986 \leq NA_{ob}/N0 \leq 0.995 \quad (1)$$

$$0.0095 \leq 1/(N1 \times v1) \leq 0.015 \quad (2)$$

In these conditional expressions, $NA_{ob}$ indicates a numerical aperture of the object side of the microscope objective; $N0$, a refractive index that an immersion liquid used for the microscope objective has for an e line; $N1$, a refractive index that the meniscus lens included in the first cemented lens has for the e line; $v1$, an Abbe number that the meniscus lens has for a d line.

BRIEF DESCRIPTION OF THE DRAWINGS

The present invention will be more apparent from the following detailed description when the accompanying drawings are referenced.

FIG. 1 is a cross-sectional view of an objective 1 in accordance with a first embodiment of the invention;

FIG. 2 is a cross-sectional view of a tube lens 10;

FIGS. 5A-5D are each an aberration diagram for an optical system that includes the objective 2 depicted in FIG. 4 and the tube lens 10 depicted in FIG. 2;

FIG. 6 is a cross-sectional view of an objective 3 in accordance with a third embodiment of the invention; and FIGS. 7A-7D are each an aberration diagram for an optical system that includes the objective 3 depicted in FIG. 6 and the tube lens 10 depicted in FIG. 2.

DESCRIPTION OF THE EMBODIMENTS

Figures 3A, 3B, 3C, 3D:
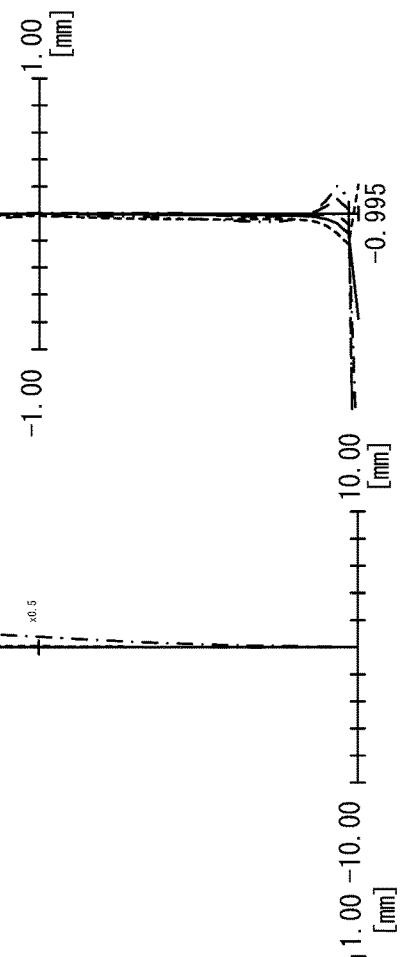
FIGS. 3A-3D are each an aberration diagram for an optical system that includes the objective 1 depicted in FIG. 1 and the tube lens 10 depicted in FIG. 2.

A method for achieving a high numerical aperture involves using a special oil or cover glass. Without using such a special oil or cover glass, it would be very difficult to provide a high numerical aperture and correct various aberrations such as spherical aberrations or chromatic aberrations in a preferable manner.

The following describes an objective in accordance with an embodiment of the present application. The objective in accordance with the embodiment (hereinafter simply referred to as an objective) is an infinity-corrected microscope objective used in combination with a tube lens. The objective is what is called an immersion microscope objective and is used to observe a sample with an immersion liquid filled between the sample and the objective.

The objective has a 60-fold magnification or higher and a numerical aperture of 1.49 or higher. The objective has a four-group configuration and includes a first lens group, a second lens group, a third lens group, and a fourth lens group, wherein an object, the first lens group, the second lens group, the third lens group, and the fourth lens group are arranged in this order.

The first lens group has a positive refractive power and includes: a cemented lens (hereinafter referred to as a first cemented lens) consisting of a lens having a positive refractive power and a meniscus lens; and at least one single lens having a positive refractive power, wherein the object, the first cemented lens, and the single lens are arranged in this order.

Under a high numerical aperture condition, the first lens group serves mainly to correct a Petzval sum in a preferable manner while suppressing generation of spherical aberrations. By disposing the first cemented lens, which includes a meniscus lens, within a region located in the vicinity of the object that provides a low marginal ray, the Petzval sum can be corrected effectively.

The second lens group includes a plurality of cemented lenses and has a positive refractive power overall. The lens component of the second lens group that is the closest to the object among the components of the second lens group is a cemented lens (hereinafter referred to as a second cemented lens).

The second lens group serves mainly to reduce chromatic aberrations. The second lens group includes a plurality of cemented lenses such that chromatic aberrations can be corrected effectively by using a space within the objective efficiently.

The third lens group a negative refractive power and includes a lens component having a concave surface facing an image (hereinafter referred to as a first lens component). The fourth lens group includes a lens component that is the closest to the object among the components of the fourth lens group and has a concave surface facing the object (hereinafter referred to as a second lens component). Accordingly, the third and fourth lens groups have concave surfaces adjacent to each other and facing each other. Note that the fourth lens group desirably has a negative refractive power. In this specification, a lens component is a single lens or a cemented lens.

The third lens group serves mainly to correct coma aberrations in a preferable manner. The fourth lens group serves mainly to correct astigmatisms and coma aberrations in a preferable manner.

The objective satisfies the following conditional expressions:

$$0.986 \leq NA_{ob}/N0 \leq 0.995 \quad (1)$$

$$0.0095 \leq 1/(N1 \times v1) \leq 0.015 \quad (2)$$

In these conditional expressions, $NA_{ob}$ indicates a numerical aperture of the object side of the objective; N0, a refractive index that an immersion liquid used for the objective has for an e line; N1, a refractive index that the meniscus lens included in the first cemented lens has for the e line; v1, an Abbe number that the meniscus lens included in the first cemented lens has for a d line.

Conditional expression (1) defines a relationship between a numerical aperture and the refractive index of an immersion liquid. Satisfying conditional expression (1) allows a resolution power close to the capacity of the immersion objective to be achieved so that highly detailed structures can be observed at a high resolution. Moreover, in TIRFM, a region in which evanescent light is leaked in a depth direction can be made sufficiently small.

When $NA_{ob}/N0$ is higher than an upper limit of conditional expression (1), the lens surface of the image side of the meniscus lens included in the first cemented lens needs to have a very strong refractive power, thereby making it difficult to suppress generation of high-order spherical aberrations. When $NA_{ob}/N0$ is lower than a lower limit of conditional expression (1), this will result in an insufficient resolution power, thereby making it difficult to observe detailed structures at a high resolution. It also becomes difficult to make small a region in which evanescent light is leaked in a depth direction in TIRFM.

The immersion liquid used for the objective is an immersion oil for general-purpose cover glass and has a refractive index within a range from 1.51 to 1.52, i.e., $1.51 \leq N0 \leq 1.52$. Hence, conditional expression (1) is substantially the same as the following conditional expression (1-1), which defines the numerical aperture of the objective.

$$1.48886 \leq NA_{ob} \leq 1.5124 \quad (1-1)$$

Conditional expression (2) defines a relationship between the refractive index and Abbe number of the meniscus lens included in the first cemented lens. Satisfying conditional expression (2) allows high-order spherical aberrations and chromatic aberrations to be corrected in a preferable manner.

When $1/(N1 \times v1)$ is higher than an upper limit of conditional expression (2), dispersion becomes excessively large, thereby making it difficult to correct chromatic aberrations, or the refractive index becomes excessively small, thereby making it difficult to correct high-order spherical aberrations. When $1/(N1 \times v1)$ is lower than a lower limit of conditional expression (2), it is difficult for an optical material to have sufficient transmittance and uniformity at a wavelength in a visible region.

The objective may satisfy conditional expression (2-1) instead of conditional expression (2).

$$0.01 \leq 1/(N1 \times v1) \leq 0.014 \quad (2-1)$$

An objective configured as described above may have a numerical aperture of 1.49 or higher and allows an object to be observed at a high resolution by using weak light from the object in an observation in which an immersion oil having a refractive index of about 1.52 is used as an immersion liquid.

The following describes desirable configurations of the objective.

The first lens group desirably includes a plurality of single lenses each having a positive refractive power. By the first lens group including a plurality of single lenses each having a positive refractive power, the refractive power of each lens surface can be made weak. This allows a high numerical aperture to be achieved while suppressing generation of chromatic aberrations.

The lens of the first cemented lens that has a positive refractive power is desirably a planoconvex lens having a plane surface facing the object. By the objective having a plane surface as the lens surface that is the closest to the object among the lens surfaces of the objective, bubbles can be made unlikely to be trapped between the immersion liquid and the objective in a process of combining the objective with an upright microscope.

The plurality of cemented lenses included in the second lens group desirably include a cemented triplet lens. By the plurality of cemented lenses including a cemented triplet lens, chromatic aberrations can be corrected more effectively.

The fourth lens group desirably includes a plurality of lens components. The inclusion of a plurality of lens components will result in at least one air space being included in the fourth lens group. This decreases a correlation between a coma aberration and a chromatic aberration of magnification, thereby facilitating correction of both the coma aberration and the chromatic aberration of magnification.

The objective may satisfy at least one of the following conditional expressions:

$$0.05 \leq D1/H1 \leq 0.335 \quad (3)$$

$$0.87 \leq R1/R2 \leq 1.22 \quad (4)$$

$$0.21 \leq (hg2-hg1)/t1 \leq 3 \quad (5)$$

In these conditional expressions, H1 indicates a maximum ray height of an axial marginal ray within the first lens group (hereinafter referred to as a first ray height); D1, the thickness of a lens through which an axial marginal ray passes with the first ray height; R1, the radius of curvature of the lens surface of the object side of the meniscus lens included in the first cemented lens; R2, the radius of curvature of the lens surface of the image side of the meniscus lens included in the first cemented lens; hg1, the height of an axial marginal ray at the lens surface of the object side of the second lens component; hg2, the height of an axial marginal ray at the lens surface of the image side of the second lens component; t1, a thickness that the second lens component has on an optical axis.

Conditional expression (3) defines a relationship between a ray height within the first lens group and a lens thickness. An immersion objective having a numerical aperture that is much higher than 1.4 is such that a ray needs to be gradually bent by a plurality of lens surfaces each having a positive refractive power, so as to suppress generation of high-order spherical aberrations. Satisfying conditional expression (3) allows a plurality of lens surfaces to be disposed in a region within the first lens group in which a ray is provided with high ray height, so that a high numerical aperture can be achieved while suppressing generation of high-order spherical aberrations.

When D1/H1 is higher than an upper limit of conditional expression (3), it is difficult to dispose a plurality of lens surfaces in a region within the first lens group in which a ray is provided with high ray height. As a result, high-order spherical aberrations are easily generated. When D1/H1 is lower than a lower limit of conditional expression (3), the intervals between the lens surfaces in a region within the first lens group in which a ray is provided with high ray height become excessively short. This makes it difficult to decrease the radius of curvature of each lens surface, and hence it is difficult for the lens surfaces to have a sufficient refractive power. As a result, chromatic aberrations are difficult to be corrected.

The objective may satisfy conditional expression (3-1) instead of conditional expression (3).

$$0.2 \leq D1/H1 \leq 0.33 \qquad (3\text{-}1)$$

Conditional expression (4) defines a relationship between the radius of curvatures of the lens surfaces of the meniscus lens included in the first cemented lens. It is difficult to correct chromatic aberrations when an excessively high ray is emitted from the first cemented lens. Satisfying conditional expression (4) allows a ray to become low at the lens surface of the image side of the first cemented lens so that the ray can be prevented from becoming excessively high within the first lens group. Hence, chromatic aberrations can be easily corrected while suppressing generation of high-order spherical aberrations.

When R1/R2 is higher than an upper limit of conditional expression (4), a ray becomes excessively low in a region on the image side of the first cemented lens. As a result, the first lens group provides a large Petzval sum, thereby making it difficult for the entirety of the objective to correct a field curvature. When R1/R2 is lower than a lower limit of conditional expression (4), a ray becomes excessively high in a region on the image side of the first cemented lens. This makes it difficult to correct chromatic aberrations while suppressing generation of high-order spherical aberrations.

The objective may satisfy conditional expression (4-1) instead of conditional expression (4).

$$0.9 \leq R1/R2 \leq 1.2 \qquad (4\text{-}1)$$

Conditional expression (5) defines a relationship between the ray height in the second lens component of the fourth lens group that is the closest to the object among the components of the fourth lens group and the thickness of the second lens component. Satisfying conditional expression (5) allows the ray height in the second lens group to be significantly changed. Hence, high-order coma aberrations can be corrected, and an image having a high contrast for a region up to the edge of a field of view can be obtained using an objective having a high numerical aperture that is higher than 1.49.

When $(hg2-hg1)/t1$ is higher than an upper limit of conditional expression (5), light is greatly refracted at both of the lens surfaces of the object side and image side of the second lens component. Hence, high-order spherical aberrations and coma aberrations are generated, and a preferable image cannot be obtained. When $(hg2-hg1)/t1$ is lower than a lower limit of conditional expression (5), an objective having a high numerical aperture that is higher than 1.49 cannot sufficiently correct high-order coma aberrations. Hence, an image having a high contrast for a region up to the edge of a field of view cannot be obtained.

The objective may satisfy conditional expression (5-1) instead of conditional expression (5).

$$0.223 \leq (hg2-hg1)/t1 \leq 1 \qquad (5\text{-}1)$$

The objective may use only one of the above-described conditional expressions or may use a combination of conditional expressions freely selected from these conditional expressions, and any combination can be used to achieve sufficiently advantageous effects. The upper and lower limits of the conditional expressions may each be independently changed to provide a new conditional expression which will also achieve similar advantageous effects.

The following specifically describes embodiments of the objective.

First Embodiment

FIG. 1 is a cross-sectional view of an objective 1 in accordance with the present embodiment. The objective 1 is an immersion microscope objective that includes a first lens group G1, a second lens group G2, a third lens group G3, and a fourth lens group G4, wherein an object, the first lens group G1, the second lens group G2, the third lens group G3, and the fourth lens group G4 are arranged in this order.

The first lens group G1 includes a cemented lens CL1, a lens L3 that is a meniscus lens having a concave surface facing the object, and a lens L4 that is a biconvex lens, wherein the object, the cemented lens CL1, the lens L3, and the lens L4 are arranged in this order, and the first lens group G1 has a positive refractive power overall. The cemented lens CL1, which is a first cemented lens of the objective 1, consists of a lens L1 that is a planoconvex lens and a lens L2 that is a meniscus lens having a concave surface facing the object, wherein the object, the lens L1, and the lens L2 are arranged in this order. The lenses L3 and L4 are each a single lens having a positive refractive power.

The second lens group G2 includes a cemented lens CL2, a cemented lens CL3, and a cemented lens CL4, wherein the object, the cemented lens CL2, the cemented lens CL3, and the cemented lens C14 are arranged in this order, and the second lens group G2 has a positive refractive power overall. The cemented lens CL2 is a second cemented lens of the objective 1. The cemented lens CL2, which is a cemented triplet lens, consists of a lens L5 that is a biconvex lens, a lens L6 that is a biconcave lens, and a lens L7 that is a biconvex lens, wherein the object, the lens L5, the lens L6, and the lens L7 are arranged in this order. The cemented lens CL3, which is a cemented triplet lens, consists of a lens L8 that is a meniscus lens having a concave surface facing an image, a lens L9 that is a biconvex lens, and a lens L10 that is a meniscus lens having a concave surface facing the object, wherein the object, the lens L8, the lens L9, and the lens L10 are arranged in this order. The cemented lens CL4, which is a cemented doublet lens, consists of a lens L11 that is a biconvex lens and a lens L12 that is a biconcave lens, wherein the object, the lens L11, and the lens L12 are arranged in this order.

The third lens group G3 includes a cemented lens CL5 and has a negative refractive power. The cemented lens CL5 is a first lens component of the objective 1 that has a concave surface facing the image. The cemented lens CL5, which is a cemented doublet lens, consists of a lens L13 that is a biconvex lens and a lens L14 that is a biconcave lens, wherein the object, the lens L13, and the lens L14 are arranged in this order.

The fourth lens group G4 includes a lens L15 that is a biconcave lens and a lens L16 that is a meniscus lens having a concave surface facing the object, wherein the object, the lens L15, and the lens L16 are arranged in this order. The lens L15 is a second lens component of the objective 1 that has a concave surface facing the object.

Various data on the objective 1 are indicated below, where β indicates the magnification of the objective 1.

β=−99.9417, $NA_{ob}$=1.500, N0=1.5179, N1=1.75844, v1=52.320, D1=2.210 mm, H1=6.677 mm, R1=−2.9072 mm, R2=−2.9038 mm, hg1=1.4030 mm, hg2=1.6280 mm, t1=1.0000 mm

The following are lens data of the objective 1. INF in the lens data indicates infinity (∞).

| Objective 1 | | | | |
|---|---|---|---|---|
| s | r | d | ne | vs |
| 1 | INF | 0.1700 | 1.52626 | 54.41 |
| 2 | INF | 0.1500 | 1.51793 | 41.00 |
| 3 | INF | 0.7500 | 1.52033 | 58.90 |
| 4 | −2.9072 | 3.2600 | 1.75844 | 52.32 |
| 5 | −2.9038 | 0.1200 | | |
| 6 | −36.6893 | 3.3900 | 1.57098 | 71.30 |
| 7 | −8.3325 | 0.2203 | | |
| 8 | 48.4017 | 2.2100 | 1.57098 | 71.30 |
| 9 | −27.2881 | 0.1500 | | |
| 10 | 13.7087 | 6.6800 | 1.43986 | 94.66 |
| 11 | −8.2672 | 0.9500 | 1.64132 | 42.41 |
| 12 | 20.7526 | 4.7200 | 1.43986 | 94.66 |
| 13 | −10.2050 | 0.2099 | | |
| 14 | 78.1000 | 0.7500 | 1.75844 | 52.32 |
| 15 | 8.4747 | 5.5100 | 1.43986 | 94.66 |
| 16 | −6.6481 | 0.7500 | 1.64132 | 42.41 |
| 17 | −20.0544 | 0.8904 | | |
| 18 | 10.0255 | 2.7300 | 1.43986 | 94.66 |
| 19 | −30.8626 | 0.7500 | 1.64132 | 42.41 |
| 20 | 83.4717 | 0.3744 | | |
| 21 | 5.5353 | 3.5200 | 1.57098 | 71.30 |
| 22 | −13.6914 | 3.4100 | 1.75844 | 52.32 |
| 23 | 2.5913 | 1.8500 | | |
| 24 | −2.6281 | 1.0000 | 1.64132 | 42.41 |
| 25 | 24.0146 | 2.7515 | | |
| 26 | −73.7044 | 2.1500 | 1.74340 | 32.33 |
| 27 | −6.7507 | 114.644 | | | s indicates a surface number; r, a radius of curvature (mm); d, a surface interval (mm); ne, a refractive index for an e line; vd, an Abbe number for a d line. These marks are also applicable to the embodiments described hereinafter. Surface numbers s1 and s2 respectively indicate an object surface (surface of cover glass CG on an object side) and a surface of the cover glass CG on an image side. Surface numbers s3 and s27 respectively indicate a lens surface of the objective 1 that is the closest to an object among the lens surfaces of the objective 1 and a lens surface of the objective 1 that is the closest to an image among the lens surfaces of the objective 1.

As indicated in the following, the objective 1 satisfies conditional expressions (1)-(5).

$NA_{ob}/N0=0.9882$ (1)

$1/(N1\times v1)=0.0109$ (2)

$D1/H1=0.331$ (3)

$R1/R2=1.001$ (4)

$(hg2-hg1)/t1=0.225$ (5)

FIG. 2 is a cross-sectional view of a tube lens 10 to be used in combination with the objective 1. The tube lens 10 is a microscope tube lens combined with an infinity-corrected objective so as to form an enlarged image of an object. The tube lens 10 includes a cemented lens CTL1 and a cemented lens CTL2, wherein the object, the cemented lens CTL1, and the cemented lens CTL2 are arranged in this order. The cemented lens CTL1 consists of a lens TL1 that is a biconvex lens and a lens TL2 that is a meniscus lens having a concave surface facing the object. The cemented lens CTL2 consists of a lens TL3 that is a biconvex lens and a lens TL4 that is a biconcave lens. The "d" (mm) of the lens surface of the objective 1 that is the closest to the image among the lens surfaces of the objective 1 (surface identified as surface number s27) is a distance on an optical axis to the lens surface of the tube lens 10 that is the closest to the object among the lens surfaces of the tube lens 10 (surface identified as surface number s1). The tube lens 10 has a focal length of 179.99 mm.

The following are lens data of the tube lens 10.

| Tube lens 10 | | | | |
|---|---|---|---|---|
| s | r | d | ne | vs |
| 1 | 68.7541 | 7.7321 | 1.48915 | 70.23 |
| 2 | −37.5679 | 3.4742 | 1.81078 | 40.92 |
| 3 | −102.8477 | 0.6973 | | |
| 4 | 84.3099 | 6.0238 | 1.83932 | 37.16 |
| 5 | −50.7100 | 3.0298 | 1.64824 | 40.82 |
| 6 | 40.6619 | | | |

FIGS. 3A-3D are each an aberration diagram for an optical system that includes the objective 1 and the tube lens 10 and indicate aberrations that occur on an image surface formed by the objective 1 and the tube lens 10. FIG. 3A is a spherical aberration diagram. FIG. 3B illustrates a sine-condition violation amount. FIG. 3C is an astigmatism diagram. FIG. 3D is a coma aberration diagram for an image height ratio of 0.7. "M" in the figures indicates a meridional component, and "S" indicates a sagittal component.

Second Embodiment

Figure 4:
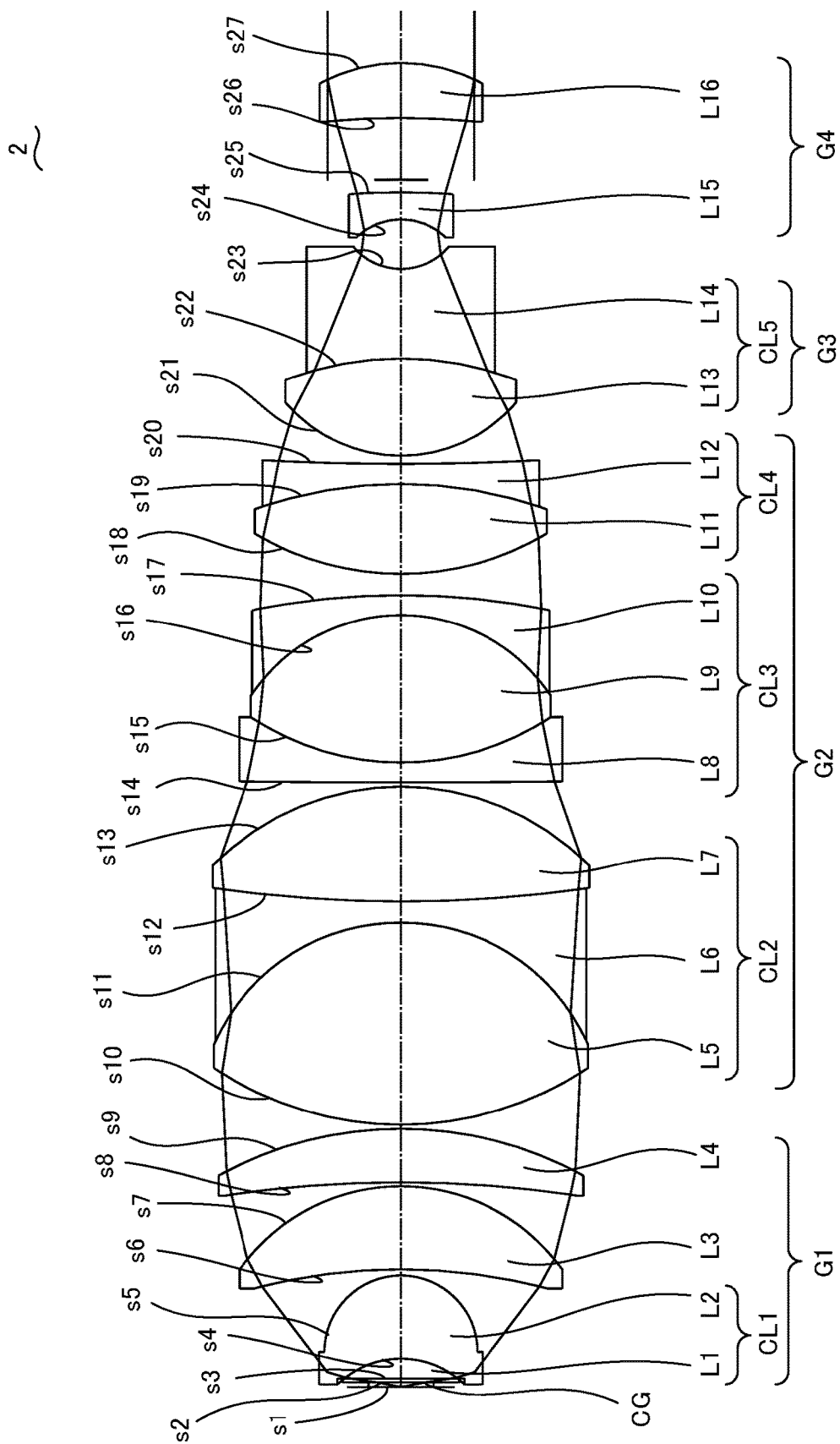
FIG. 4 is a cross-sectional view of an objective 2 in accordance with a second embodiment of the invention.

FIG. 4 is a cross-sectional view of an objective 2 in accordance with the present embodiment. The objective 2 is an immersion microscope objective that includes a first lens group G1, a second lens group G2, a third lens group G3, and a fourth lens group G4, wherein an object, the first lens group G1, the second lens group G2, the third lens group G3, and the fourth lens group G4 are arranged in this order.

The first lens group G1 includes a cemented lens CL1, a lens L3 that is a meniscus lens having a concave surface facing the object, and a lens L4 that is a meniscus lens having a concave surface facing the object, wherein the object, the cemented lens CL1, the lens L3, and the lens L4 are arranged in this order, and the first lens group G1 has a positive refractive power overall. The cemented lens CL1, which is a first cemented lens of the objective 2, consists of a lens L1 that is a planoconvex lens and a lens L2 that is a meniscus lens having a concave surface facing the object, wherein the object, the lens L1, and the lens L2 are arranged in this order. The lenses L3 and L4 are each a single lens having a positive refractive power.

The second lens group G2 includes a cemented lens CL2, a cemented lens CL3, and a cemented lens CL4, wherein the object, the cemented lens CL2, the cemented lens CL3, and the cemented lens C14 are arranged in this order, and the second lens group G2 has a positive refractive power overall. The cemented lens CL2 is a second cemented lens of the objective 2. The cemented lens CL2, which is a cemented triplet lens, consists of a lens L5 that is a biconvex lens, a lens L6 that is a biconcave lens, and a lens L7 that is a biconvex lens, wherein the object, the lens L5, the lens L6, and the lens L7 are arranged in this order. The cemented lens CL3, which is a cemented triplet lens, consists of a lens L8 that is a meniscus lens having a concave surface facing an image, a lens L9 that is a biconvex lens, and a lens L10 that is a meniscus lens having a concave surface facing the object, wherein the object, the lens L8, the lens L9, and the lens L10 are arranged in this order. The cemented lens CL4, which is a cemented doublet lens, consists of a lens L11 that is a biconvex lens and a lens L12 that is a biconcave lens, wherein the object, the lens L11, and the lens L12 are arranged in this order.

The third lens group G3 includes a cemented lens CL5 and has a negative refractive power. The cemented lens CL5 is a first lens component of the objective 2 that has a concave surface facing the image. The cemented lens CL5, which is a cemented doublet lens, consists of a lens L13 that is a biconvex lens and a lens L14 that is a biconcave lens, wherein the object, the lens L13, and the lens L14 are arranged in this order.

The fourth lens group G4 includes a lens L15 that is a meniscus lens having a concave surface facing the object and a lens L16 that is a meniscus lens having a concave surface facing the object, wherein the object, the lens L15, and the lens L16 are arranged in this order. The lens L15 is a second lens component of the objective 2 that has a concave surface facing the object. The "d" (mm) of the lens surface of the objective 2 that is the closest to the image among the lens surfaces of the objective 2 (surface identified as surface number s27) is a distance on an optical axis to the lens surface of the tube lens 10 that is the closest to the object among the lens surfaces of the tube lens 10 (surface identified as surface number s1).

The following are various data on the objective 2.

$\beta=-99.9363$, $NA_{ob}=1.500$, $N0=1.51793$, $N1=1.75844$, $v1=52.320$, $D1=2.000$ mm, $H1=6.508$ mm, $R1=-3.3979$ mm, $R2=-2.8484$ mm, $hg1=1.3690$ mm, $hg2=1.6390$ mm, $t1=1.0000$ mm The following are lens data of the objective 2.

| Object 2 | | | | |
|---|---|---|---|---|
| s | r | d | ne | vs |
| 1 | INF | 0.1700 | 1.52626 | 54.41 |
| 2 | INF | 0.1500 | 1.51793 | 41.00 |
| 3 | INF | 0.7300 | 1.52033 | 58.90 |
| 4 | −3.3979 | 3.1179 | 1.75844 | 52.32 |
| 5 | −2.8484 | 0.2246 | | |
| 6 | −21.5029 | 3.0999 | 1.57098 | 71.30 |
| 7 | −7.3840 | 0.1500 | | |
| 8 | −43.0779 | 2.0000 | 1.57098 | 71.30 |
| 9 | −14.0837 | 0.1500 | | |
| 10 | 12.5378 | 7.5482 | 1.43986 | 94.66 |
| 11 | −7.6295 | 0.7748 | 1.64132 | 42.41 |
| 12 | 47.9219 | 4.2998 | 1.43986 | 94.66 |
| 13 | −9.8247 | 0.1500 | | |
| 14 | 428.0000 | 0.7498 | 1.75844 | 52.32 |
| 15 | 10.0791 | 5.4967 | 1.43986 | 94.66 |
| 16 | −6.6855 | 0.7498 | 1.64132 | 42.41 |
| 17 | −27.4437 | 0.7908 | | |
| 18 | 10.5679 | 3.3501 | 1.57098 | 71.30 |
| 19 | −16.2616 | 0.7538 | 1.64132 | 42.41 |
| 20 | 96.9574 | 0.3011 | | |
| 21 | 5.6427 | 3.6315 | 1.57098 | 71.30 |
| 22 | −11.9358 | 3.3450 | 1.75844 | 52.32 |
| 23 | 2.3215 | 1.8500 | | |
| 24 | −2.3655 | 1.0000 | 1.64132 | 42.41 |
| 25 | −27.4646 | 2.7905 | | |
| 26 | −27.4049 | 2.0535 | 1.74340 | 32.33 |
| 27 | −6.3096 | 114.632 | | |

As indicated in the following, the objective 2 satisfies conditional expressions (1)-(5).

$$NA_{ob}/N0 = 0.9882 \quad (1)$$

$$1/(N1 \times v1) = 0.0109 \quad (2)$$

$$D1/H1 = 0.307 \quad (3)$$

$$R1/R2 = 1.193 \quad (4)$$

$$(hg2 - hg1)/t1 = 0.270 \quad (5)$$

FIGS. 5A-5D are each an aberration diagram for an optical system that includes the objective 2 and the tube lens 10 and indicate aberrations that occur on an image surface formed by the objective 2 and the tube lens 10. FIG. 5A is a spherical aberration diagram. FIG. 5B illustrates a sine-condition violation amount. FIG. 5C is an astigmatism diagram. FIG. 5D is a coma aberration diagram for an image height ratio of 0.7.

Third Embodiment

FIG. 6 is a cross-sectional view of an objective 3 in accordance with the present embodiment. The objective 3 is an immersion microscope objective that includes a first lens group G1, a second lens group G2, a third lens group G3, and a fourth lens group G4, wherein an object, the first lens group G1, the second lens group G2, the third lens group G3, and the fourth lens group G4 are arranged in this order.

The first lens group G1 includes a cemented lens CL1 and a lens L3 that is a meniscus lens having a concave surface facing the object, wherein the object, the cemented lens CL1, and the lens L3 are arranged in this order, and the first lens group G1 has a positive refractive power overall. The cemented lens CL1, which is a first cemented lens of the objective 3, consists of a lens L1 that is a planoconvex lens and a lens L2 that is a meniscus lens having a concave surface facing the object, wherein the object, the lens L1, and the lens L2 are arranged in this order. The lens L3 is a single lens having a positive refractive power.

The second lens group G2 includes a cemented lens CL2, a cemented lens CL3, and a lens L10 that is a biconvex lens, wherein the object, the cemented lens CL2, the cemented lens CL3, and the lens L10 are arranged in this order, and the second lens group G2 has a positive refractive power overall. The cemented lens CL2 is a second cemented lens of the objective 3. The cemented lens CL2, which is a cemented triplet lens, consists of a lens L4 that is a biconvex lens, a lens L5 that is a meniscus lens having a concave surface facing the object, and a lens L6 that is a meniscus lens having a concave surface facing the object, wherein the object, the lens L4, the lens L5, and the lens L6 are arranged in this order. The cemented lens CL3, which is a cemented triplet lens, consists of a lens L7 that is a meniscus lens having a concave surface facing the image, a lens L8 that is biconvex lens, and a lens L9 that is a meniscus lens having a concave surface facing the object, wherein the object, the lens L7, the lens L8, and the lens L9 are arranged in this order.

The third lens group G3 includes a cemented lens CL4 and has a negative refractive power. The cemented lens CL4 is a first lens component of the objective 3 that has a concave surface facing the image. The cemented lens CL4, which is a cemented doublet lens, consists of a lens L11 that is a biconvex lens and a lens L12 that is a biconcave lens, wherein the object, the lens L11, and the lens L12 are arranged in this order.

The fourth lens group G4 includes a cemented lens CL5. The cemented lens CL5 is a cemented doublet lens and consists of a lens L13 that is a meniscus lens having a concave surface facing the object and a lens L14 that is a meniscus lens having a concave surface facing the object, wherein the object, the lens L13, and the lens L14 are arranged in this order. The cemented lens CL5 is a second lens component of the objective 3 that has a concave surface facing the object. The "d" (mm) of the lens surface of the objective 3 that is the closest to the image among the lens surfaces of the objective 3 (surface identified as surface number s23) is a distance on an optical axis to the lens surface of the tube lens 10 that is the closest to the object among the lens surfaces of the tube lens 10 (surface identified as surface number s1).

The following are various data on the objective 3.

$\beta=-60.0107$, $NA_{ob}=1.500$, $N0=1.5179$, $N1=1.88815$, $v1=40.760$, $D1=1.3057$ mm, $H1=5.387$ mm, $R1=-3.0323$ mm, $R2=-3.3067$ mm, $hg1=2.7620$ mm, $hg2=5.5660$ mm, $t1=7.0799$ mm The following are lens data of the objective 3.

| Objective 3 | | | | |
|---|---|---|---|---|
| s | r | d | ne | vs |
| 1 | INF | 0.1700 | 1.52626 | 54.41 |
| 2 | INF | 0.1517 | 1.51793 | 41.00 |
| 3 | INF | 0.7556 | 1.51825 | 64.14 |
| 4 | −3.0323 | 3.6488 | 1.88815 | 40.76 |
| 5 | −3.3067 | 0.1000 | | |
| 6 | −10.0000 | 1.3057 | 1.88815 | 40.76 |
| 7 | −7.6719 | 0.1500 | | |
| 8 | 13.0236 | 7.3756 | 1.43985 | 94.93 |
| 9 | −8.0420 | 0.5725 | 1.74341 | 32.26 |
| 10 | −28.0828 | 3.6594 | 1.43985 | 94.93 |
| 11 | −10.2544 | 0.3110 | | |
| 12 | 45.4925 | 0.5645 | 1.64132 | 42.41 |
| 13 | 14.4615 | 7.2751 | 1.43985 | 94.93 |
| 14 | −7.8092 | 0.5636 | 1.64132 | 42.41 |
| 15 | −32.0204 | 0.2501 | | |
| 16 | 12.2183 | 5.1408 | 1.43985 | 94.93 |
| 17 | −24.5259 | 0.1499 | | |
| 18 | 6.3796 | 5.3858 | 1.43985 | 94.93 |
| 19 | −12.7768 | 0.5784 | 1.64132 | 42.41 |
| 20 | 3.7146 | 4.2719 | | |
| 21 | −3.3463 | 4.3611 | 1.77621 | 49.60 |
| 22 | −11.0800 | 2.7188 | 1.79173 | 26.29 |
| 23 | −7.3475 | 114.689 | | |

As indicated in the following, the objective 3 satisfies conditional expressions (1)-(5).

$$NA_{ob}/N0=0.9882 \quad (1)$$

$$1/(N1 \times v1)=0.0130 \quad (2)$$

$$D1/H1=0.242 \quad (3)$$

$$R1/R2=0.917 \quad (4)$$

$$(hg2-hg1)/t1=0.396 \quad (5)$$

FIGS. 7A-7D are each an aberration diagram for an optical system that includes the objective 3 and the tube lens 10 and indicate aberrations that occur on an image surface formed by the objective 3 and the tube lens 10. FIG. 7A is a spherical aberration diagram. FIG. 7B illustrates a sine-condition violation amount. FIG. 7C is an astigmatism diagram. FIG. 7D is a coma aberration diagram for an image height ratio of 0.5.

What is claimed is:

1. An immersion microscope objective comprising:
a first lens group that has a positive refractive power and includes a first cemented lens and at least one single lens having a positive refractive power, the first cemented lens consisting of a lens having a positive refractive power and a meniscus lens;
a second lens group that has a positive refractive power and includes a plurality of cemented lenses, the plurality of cemented lenses including a second cemented lens that is closest to an object among the components of the second lens group;
a third lens group that has a negative refractive power and includes a first lens component having a concave surface facing an image; and
a fourth lens group that includes a second lens component that is closest to the object among lens components of the fourth lens group, the second lens component having a concave surface facing the object, wherein
the object, the first lens group, the second lens group, the third lens group, and the fourth lens group are arranged in this order, and
the immersion microscope objective satisfies the following conditional expressions:

$$0.986 \leq NA_{ob}/N0 \leq 0.995 \quad (1)$$

$$0.0095 \leq 1/(N1 \times v1) \leq 0.015 \quad (2)$$

where $NA_{ob}$ indicates a numerical aperture of an object side of the immersion microscope objective, N0 indicates a refractive index that an immersion liquid used for the immersion microscope objective has for an e line, N1 indicates a refractive index that the meniscus lens included in the first cemented lens has for the e line, and v1 indicates an Abbe number that the meniscus lens has for a d line.

2. The immersion microscope objective of claim 1, satisfying the following conditional expression:

$$0.05 \leq D1/H1 \leq 0.335 \quad (3)$$

where H1 indicates a first ray height that is a maximum ray height of an axial marginal ray within the first lens group, and D1 indicates a thickness of a lens through which the axial marginal ray passes with the first ray height.

3. The immersion microscope objective of claim 1, wherein
the first lens group includes a plurality of single lenses each having a positive refractive power.

4. The immersion microscope objective of claim 2, wherein
the first lens group includes a plurality of single lenses each having a positive refractive power.

5. The immersion microscope objective of claim 1, satisfying the following conditional expression:

$$0.87 \leq R1/R2 \leq 1.22 \quad (4)$$

where R1 indicates a radius of curvature of a lens surface of an object side of the meniscus lens included in the first cemented lens, and R2 indicates a radius of curvature of a lens surface of an image side of the meniscus lens included in the first cemented lens.

6. The immersion microscope objective of claim 2, satisfying the following conditional expression:

$$0.87 \le R1/R2 \le 1.22 \qquad (4)$$

where R1 indicates a radius of curvature of a lens surface of an object side of the meniscus lens included in the first cemented lens, and R2 indicates a radius of curvature of a lens surface of an image side of the meniscus lens included in the first cemented lens.

7. The immersion microscope objective of claim 3, satisfying the following conditional expression:

$$0.87 \le R1/R2 \le 1.22 \qquad (4)$$

where R1 indicates a radius of curvature of a lens surface of an object side of the meniscus lens included in the first cemented lens, and R2 indicates a radius of curvature of a lens surface of an image side of the meniscus lens included in the first cemented lens.

8. The immersion microscope objective of claim 4, satisfying the following conditional expression:

$$0.87 \le R1/R2 \le 1.22 \qquad (4)$$

where R1 indicates a radius of curvature of a lens surface of an object side of the meniscus lens included in the first cemented lens, and R2 indicates a radius of curvature of a lens surface of an image side of the meniscus lens included in the first cemented lens.

9. The immersion microscope objective of claim 1, wherein
the fourth lens group includes a plurality of lens components.

10. The immersion microscope objective of claim 2, wherein
the fourth lens group includes a plurality of lens components.

11. The immersion microscope objective of claim 3, wherein
the fourth lens group includes a plurality of lens components.

12. The immersion microscope objective of claim 4, wherein
the fourth lens group includes a plurality of lens components.

13. The immersion microscope objective of claim 5, wherein
the fourth lens group includes a plurality of lens components.

14. The immersion microscope objective of claim 6, wherein
the fourth lens group includes a plurality of lens components.

15. The immersion microscope objective of claim 7, wherein
the fourth lens group includes a plurality of lens components.

16. The immersion microscope objective of claim 8, wherein
the fourth lens group includes a plurality of lens components.

17. The immersion microscope objective of claim 1, satisfying the following conditional expression:

$$0.21 \le (hg2-hg1)/t1 \le 3 \qquad (5)$$

where hg1 indicates a height of an axial marginal ray at a lens surface of an object side of the second lens component, hg2 indicates a height of the axial marginal ray at a lens surface of an image side of the second lens component, and t1 indicates a thickness that the second lens component has on an optical axis.

18. The immersion microscope objective of claim 2, satisfying the following conditional expression:

$$0.21 \le (hg2-hg1)/t1 \le 3 \qquad (5)$$

where hg1 indicates a height of an axial marginal ray at a lens surface of an object side of the second lens component, hg2 indicates a height of the axial marginal ray at a lens surface of an image side of the second lens component, and t1 indicates a thickness that the second lens component has on an optical axis.

19. The immersion microscope objective of claim 3, satisfying the following conditional expression:

$$0.21 \le (hg2-hg1)/t1 \le 3 \qquad (5)$$

where hg1 indicates a height of an axial marginal ray at a lens surface of an object side of the second lens component, hg2 indicates a height of the axial marginal ray at a lens surface of an image side of the second lens component, and t1 indicates a thickness that the second lens component has on an optical axis.

20. The immersion microscope objective of claim 4, satisfying the following conditional expression:

$$0.21 \le (hg2-hg1)/t1 \le 3 \qquad (5)$$

where hg1 indicates a height of an axial marginal ray at a lens surface of an object side of the second lens component, hg2 indicates a height of the axial marginal ray at a lens surface of an image side of the second lens component, and t1 indicates a thickness that the second lens component has on an optical axis.

\* \* \* \* \*